US010690797B2

(12) United States Patent
Loubet (10) Patent No.: US 10,690,797 B2
(45) Date of Patent: Jun. 23, 2020

(54) LOCATOR DEVICE OF METAL OBJECTS WITH INTEGRATED COMMUNICATION INTERFACE

(71) Applicant: XPLORER SARL, Castanet-Tolosan (FR)

(72) Inventor: Alain Loubet, Castanet-Tolosan (FR)

(73) Assignee: XPLORER SARL, Castanet-Tolosan (FR)

( * ) Notice: Subject to any disclaimer, the term of this patent is extended or adjusted under 35 U.S.C. 154(b) by 0 days.

(21) Appl. No.: 15/827,463

(22) Filed: Nov. 30, 2017

(65) Prior Publication Data
US 2018/0335540 A1 Nov. 22, 2018

Related U.S. Application Data

(62) Division of application No. 14/623,065, filed on Feb. 16, 2015.

(30) Foreign Application Priority Data

Feb. 20, 2014 (FR) ...................... 14 51349

(51) Int. Cl.
*G01V 3/15* (2006.01)
*G01V 3/165* (2006.01)
*G01V 3/17* (2006.01)
(52) U.S. Cl.
CPC .................. *G01V 3/17* (2013.01); *G01V 3/15* (2013.01); *G01V 3/165* (2013.01)

(58) Field of Classification Search
CPC . G01V 3/15; G01V 3/165; G01V 3/08; G01V 3/081; G01V 3/10; G01V 3/101;
(Continued)

(56) References Cited

U.S. PATENT DOCUMENTS 5,696,490 A 12/1997 Maloney
6,326,790 B1 12/2001 Ott et al.
(Continued)

FOREIGN PATENT DOCUMENTS

FR 2759173 A1 8/1998
FR 2916055 A1 11/2008
(Continued)

*Primary Examiner* — David M Schindler
(74) *Attorney, Agent, or Firm* — Ipsilon USA, LLP (57) ABSTRACT

The invention relates to a portable equipment item for locating metal objects to perform an accurate location of metal objects detected by other means, which comprises at least one proximity locator (11), or pointer, comprising a detection coil as well as control means capable of generating the excitation signal for the detection coil, of performing the detection of echoes originating from metal objects from the electromagnetic signals received by the detection head and of alerting the operator when a detection is made. The control means of the proximity locator (11) further comprise radio communication means configured to exchange information with a remote equipment item comprising communication means functionally compatible with the communication means of the device according to the invention. In a preferential configuration, the equipment item also comprises an operator headset (21) equipped with such communication means.

7 Claims, 6 Drawing Sheets

(58) Field of Classification Search
CPC ........ G01V 3/102; G01V 3/104; G01V 3/105; G01V 3/107; G01V 3/108; G01V 3/17; G01D 5/20; G01D 5/2006; G01D 5/204; G01D 5/202; G01D 5/2208
See application file for complete search history.

(56) References Cited

U.S. PATENT DOCUMENTS

| | | |
|---|---|---|
| 7,940,049 B2 | 5/2011 | Loubet |
| 8,820,208 B2 | 9/2014 | Kim et al. |
| 9,347,798 B1 * | 5/2016 | Johnson ................. H04R 1/028 |
| 2005/0062476 A1 * | 3/2005 | Stamatescu .............. G01V 3/15 324/327 |
| 2009/0009173 A1 * | 1/2009 | Loubet ................... G01V 3/104 324/327 |
| 2010/0001713 A1 * | 1/2010 | Royle .................... G01V 3/081 324/67 |
| 2010/0090700 A1 * | 4/2010 | Nielsen ................... G01V 3/08 324/329 |
| 2015/0234079 A1 * | 8/2015 | Loubet .................... G01V 3/15 324/329 |
| 2016/0091629 A1 * | 3/2016 | Deng ....................... G01V 3/38 324/329 |
| 2018/0252835 A1 * | 9/2018 | Deng .................... G01V 3/105 |

FOREIGN PATENT DOCUMENTS

| | | |
|---|---|---|
| GB | 2321882 A | 8/1998 |
| KR | 2013 0106949 A | 10/2013 |
| WO | 2010/039242 A2 | 4/2010 |

* cited by examiner

LOCATOR DEVICE OF METAL OBJECTS WITH INTEGRATED COMMUNICATION INTERFACE

This application is a divisional of U.S. patent application Ser. No. 14/623,065, filed on Feb. 16, 2015, the entirety of which is incorporated by reference.

CONTEXT OF THE INVENTION

Field of the Invention

The invention relates to the general field of portable electromagnetic metal detectors.

Such detectors are used mainly for leisure, searching for coins, jewelry, treasure, but also by professionals for landmine clearance, ballistics research, or even searching for pipes or polluting metal particles in industry and the food sector.

Prior Art

There are a large variety of metal detectors on the market, commonly used for searching for and distinguishing metal objects that are buried or concealed by the vegetation covering the ground.

The metal detectors that are most commonly used, notably for leisure, operate in the frequency domain. They use the now well-known principle of phase measurement between a low-frequency alternating electromagnetic signal, emitted by a coil powered by an electrical voltage, and the signal received by another coil close to the first. Other, less widely used, alternative technologies are also employed, for example that of the type with pulsed induction, which work not in the frequency domain but in the time domain.

These metal detectors, qualified for reasons of clarity of the explanation as "usual metal detectors" hereinbelow in the text, normally consist of three parts:

a detection Head, or detection disk, generally arranged in a plane, a support rod, which may or may not be telescopic, with the detection head fitted to the end thereof, an electronic control unit which manages the ON/OFF operating state of the detector, which generates the electrical excitation signal for the emitting coil housed in the detection head and recovers and analyzes the signal detected by the receiving coil and which signals to the operator, via a display and a warning sound, that an object has been detected in the area of land covered by the detection coil.

The control unit of the usual metal detectors is generally linked to the detection head by a wired link which makes it possible to transmit the excitation signal to the coil with which the detection head is equipped and to recover, for analysis, the signal detected by the detection head.

Also very generally, these detectors comprise an earphone headset which enables the electronic unit to transmit an audible signal to the operator when an object is detected. The sound alarm device present on the unit can then be switched off, for secrecy reasons in particular.

According to the device considered, the control unit can be fixed to the support rod. Alternatively, it can be configured to be worn on the belt or over the shoulder in an appropriate case or bag.

There are currently on the market usual metal detectors further equipped with a radio link enabling the control unit to wirelessly transmit an audio detection signal to a headset equipped with a radio receiver.

There are also on the market metal detectors equipped with multipoint radio links making it possible to dispense with any wired link, the control unit managing all the elements of the detector described previously by radio link. The multipart radio link is moreover configured in such a way as to enable the detection head to be driven equally by the control unit, or, in the absence thereof, by the operator headset. Such an equipment item is notably described in the French patent published under the reference FR2916055 and held by the applicant.

This type of equipment offers the advantage of great modularity, in as much as the protocol which manages the radio links makes it possible, according to a configuration selected by the operator, or determined by default by the elements of the detector in service at the time concerned, to have the different elements (considered as subscribers on the radio link) communicate with one another, so as to ensure the best possible ergonomy for the operator while still ensuring the main detection function.

Generally, the usual detectors offered on the market generally exhibit satisfactory sensitivity, such that, as soon as an object of interest is approached, they react by signalling to the operator, by an optical or sound indication, that an object has been detected in the area covered by the electromagnetic field established by the coil of the detection head.

However, these detectors offer a very approximate target location, and do not make it possible to precisely target the position of the object. To access this object and take hold of it, it is generally necessary to put the detector to one side and clear, somewhat blindly, the area where the object is presumed to be located and, if necessary, dig into the ground.

In such a context, to facilitate this final phase of the recovery of the detected object, the use may be made, to accurately locate the object, of a "pocket" detector, or pointer, having a detection head of small diameter inside which is placed a detection coil and of dimensions comparable to those of a torch lamp, that is moved over the presumptive area while the vegetation and/or the layer of soil covering the object is cleared.

Such a locator device, commonly called "pinpointer", offers the benefit, because of its small dimensions, of being able to be displaced easily as close as possible to the ground over the area determined by means of the main metal detector with which it is associated. Moreover, because of the geometry and the dimensions of its electromagnetic head, it offers the advantage of covering a narrow detection area around the direction pointed to, such that it offers a high degree of location accuracy. The unnecessary clearance of a very large area of ground is thus advantageously avoided.

For reasons of clarity hereinafter in the explanation, such a proximity locator will be qualified as "pointer" in the following text.

There are on the market different pointer models which implement detection means that are similar in their operation to those implemented by the usual metal detectors, such as those described previously. These pointers generally have a basic user interface which is limited to an indicator that it is switched on and means for signalling the detection of a target to the operator, means whose action amounts to the emission of a warning sound emitted by a buzzer, generally accompanied by the vibration of the wall of the apparatus.

Then, when for reasons of secrecy with respect to other people in the vicinity the operator decides to cut off the sound emission produced by the buzzer, the detection of an object is signalled only by the vibration of the walls of the pointer. Now, unlike the signal emitted by the buzzer whose intensity can be modulated according to the intensity of the received signal, the vibration generated by the pointer takes account of the intensity of the detected signal only very approximately. The pointer is then more difficult to use.

The pointers also offer a standalone mode of operation, independent of any other detection equipment. Consequently, in a context of searching for objects over a given area, a usual detector is used first, as main detector, to proceed with the detection of the presence of any objects. Then, when the presence of an object is detected, a pointer is used to accurately determine the point where the object is located in the detection area covered by the detection head of the main detector. The two devices are thus implemented independently of one another, such that, when one or other of these detection equipment items is used alternately, attention must be paid to the operating disturbances that these two equipment items can generate with respect to one another, if they are active simultaneously. In such a context, the operator is generally forced to switch off one of the two detection means, either by disabling the detection signal produced by the main detector, not used at the time concerned, or by cutting the power supply thereof.

Thus, in all cases, when he (or she) uses his (or her) proximity locator, his (or her) pointer, the operator has only an isolated location apparatus, with no possible functional interaction with the main detector that was used to detect the close presence of an object. The pointer cannot then benefit from any of the functionalities which may be offered thereby, notably in the case where the main detector used is equipped with a radio link making it possible for some of its elements to exchange information, as is the case with the metal detectors equipped with headsets with wireless link, or the detectors equipped with a multipoint radio link, such as those mentioned previously.

DESCRIPTION OF THE INVENTION

One aim of the invention is to propose an equipment item for locating metal objects comprising a proximity locator, or pointer, capable of operating in a way that is at least partially integrated with a usual metal detector having at least one radio link between its control unit and an operator headset.

Another aim of the invention is to propose an equipment item for locating metal objects that is complete, functionally incorporating, to the greatest possible extent, a pointer.

To this end, the subject of the invention is, according to a first aspect, an equipment item for locating metal objects that is portable and smart, comprising a proximity locator, or pointer, said pointer comprising a detection coil capable of emitting an electromagnetic wave and of detecting the electromagnetic waves which are transmitted to it, as well as control means capable of generating the excitation signal for the detection coil, of performing the detection of echoes originating from metal objects from the electromagnetic signals detected by the detection coil and of alerting the operator when a detection is made.

According to the invention, the control means of the pointer further comprise radiofrequency communication means configured to transmit information to a remote equipment item comprising communication means that are functionally compatible with the communication means of the device according to the invention.

According to a variant embodiment of the pointer of the device according to the invention, the information transmitted by the control means consists of a signal indicating the detection of an object in the direction pointed to by the pointer.

According to another variant embodiment of this same pointer, the information transmitted by the control means also comprises information relating to the operating status and the functional configuration of the pointer itself.

According to a particular embodiment of the device according to the invention, the radiofrequency communication means of the pointer are further configured to receive commands sent by the remote equipment item.

According to a variant of this embodiment, the information received by the control means of the pointer comprises commands to switch on and off the emission produced thereby.

According to another variant of this embodiment, the information received by the control means of the pointer comprises commands for configuring the emission produced thereby.

According to a particular embodiment, the device according to the invention also comprises an operator headset, equipped with radiofrequency communication means configured to be able to establish a radiofrequency link in reception mode (single-way) or in transmission/reception mode (dual-way) with the pointer.

According to a variant of this embodiment, the pointer of the device according to the invention is configured to transmit a signal to the operator headset indicating the detection of an object in the direction that is pointed to.

According to a variant of this embodiment, the operator headset is further equipped with an audio input making it possible to link a usual metal detector equipped with an audio output intended for an operator headset to the control and monitoring unit.

According to a variant of this embodiment, the operator headset is configured to select, automatically or on a command from the operator, the detection signal transmitted by radio by the pointer or the audio detection signal transmitted by the control unit of the metal detector via an audio link cable.

According to another variant of this embodiment, the operator headset is further equipped with radiofrequency communication means, configured to be able to establish a radiofrequency link in reception mode or in transmission/reception mode with the control and monitoring unit of a main metal detector comprising communication means that are functionally compatible with the communication means of the operator headset.

According to another variant of this embodiment, the operator headset further comprises monitoring and control means that make it possible to transmit to the pointer, by radiofrequency link, a start command or operating configuration commands.

According to a particular embodiment of the device according to the invention, the control means of the pointer further comprise radiofrequency communication means configured to allow said pointer to be incorporated in a system comprising a multipoint wireless communication network, in such a way that the pointer is seen as a subscriber of this network capable of transmitting or of receiving information to or from other subscribers of this network.

According to a variant embodiment, the control means of the pointer of the device according to the invention comprise means for implementing a link of Bluetooth™ type that make it possible to exchange information with a device equipped with such a link.

According to a second aspect, another subject of the invention is a metal detector, of the type comprising:
    a support rod, a detection head placed at the end of the support rod, said detection head comprising an emitting coil and a receiving coil, the emitting coil being powered by an excitation signal, an electronic control and monitoring unit making it possible to use the detection head and analyze the information originating therefrom, an operator headset enabling the metal detector to transmit an audio detection signal to the operator;

the different elements being linked to one another by a multipoint wireless link; said metal detector further comprising ancillary means consisting of equipment for locating metal objects according to the invention, the radiofrequency link means of which are configured in such a way that the pointer of this equipment is seen as a subscriber of the multipoint wireless link.

According to a variant embodiment, the multipoint wireless link of said metal detector is configured in such a way that the pointer of the equipment for locating metal objects according to the invention can exchange information, exclusively with the control and monitoring unit of the metal detector, or directly with the operator headset of the same detector, or equally well, according to the selected operating mode, with one or other of these elements.

According to another variant embodiment, the control and monitoring unit of the metal detector is configured in such a way that the pointer of the equipment for locating metal objects according to the invention can communicate with external equipment via this unit.

According to another variant embodiment, the information transmitted by the pointer of the equipment for locating metal objects according to the invention comprises information requesting that the detection signal transmitted by the detection head of the metal detector in which it is incorporated as ancillary means not be taken into account.

According to another variant embodiment, the information transmitted by the pointer of the equipment for locating metal objects according to the invention comprises information requesting that the emission produced by the detection head of the metal detector in which it is incorporated as ancillary means be stopped.

According to a variant embodiment, the control means of the pointer of the equipment for locating metal objects of the metal detector according to the invention are configured in such a way as to ensure some of the functions of the control and monitoring unit of said metal detector so as to replace the latter.

The device according to the invention can thus advantageously be used alone as locator of metal objects, or proximity metal detectors, or even be associated more or less closely with the operation of a so-called main metal detector. In the latter use, it can advantageously replace some of the elements of said main metal detector and ensure the functions thereof.

DESCRIPTION OF THE FIGURES

The features and advantages of the invention will be better appreciated from the following description, a description that is based on the attached figures which show.

DETAILED DESCRIPTION

Figure 1:
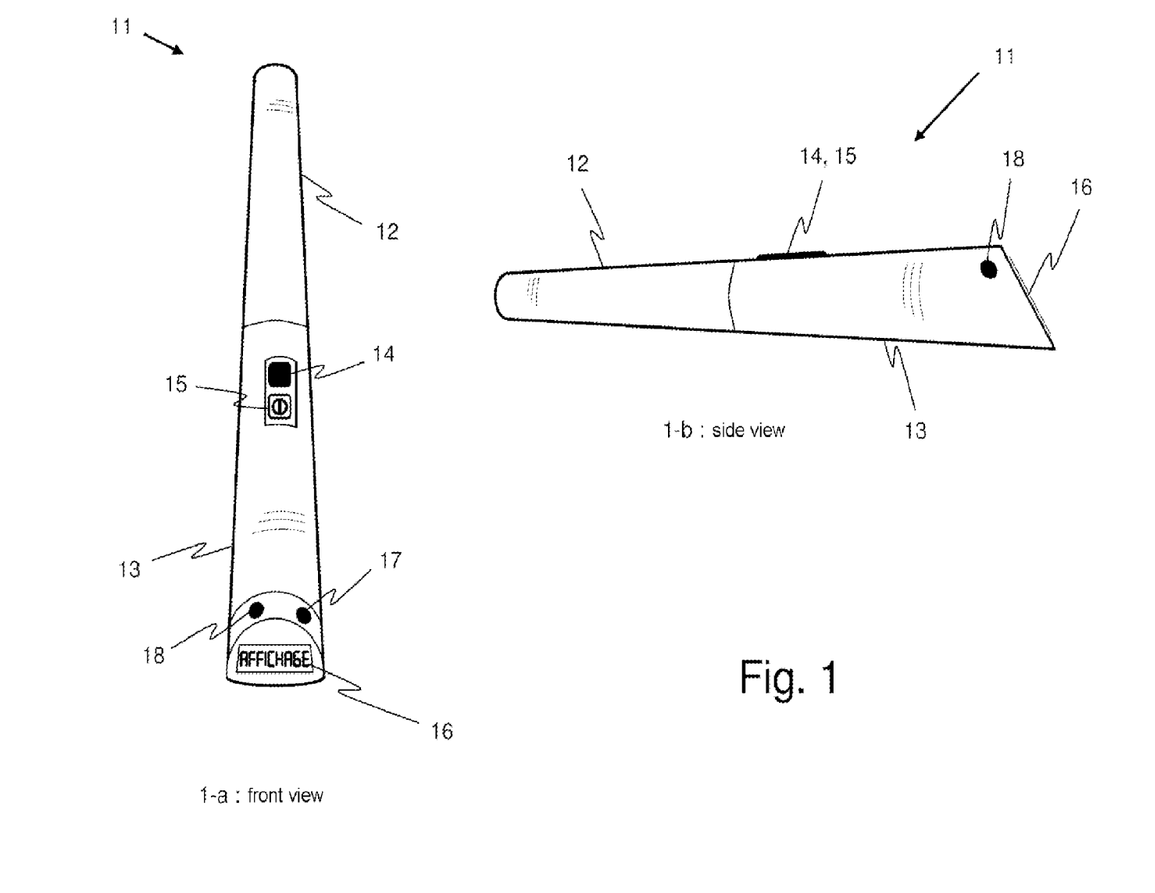
FIG. 1, a front view (1-a) and a side view (1-b) of the pointer of the equipment for locating metal objects according to the invention in a particular embodiment presented by way of example.

As illustrated in FIG. 1, in its simplest configuration, the device according to the invention comprises a proximity locator 11, or pointer, better known as "pinpointer".

As is known, the pointer 11 comprises an end 12 in which the detection coil is housed and a gripping area 13, a handle, by which the operator holds the pointer 11 in the hand, a body which contains in particular the batteries which power the pointer.

The handle 13 has means placed on it that make it possible to use the pointer according to the invention as a conventional "pinpointer", in particular an on/off button 14 making it possible to power up the pointer, and a buzzer emitting a sound signal indicating the detection of an object to the operator, a signal whose sound level can be adjusted, by means of a level controller 15 for example, and means that make it possible to make the handle 13 of the pointer vibrate, the vibration being intended notably to alert the operator to the detection of an object in the case where the latter, for reasons of secrecy in particular, has decided to disable the sound signal.

However, unlike the devices available on the market, this pointer also comprises control and monitoring means associated with radiofrequency link communication means. These means, not visible in the figure, are preferentially housed in the handle 13.

It also comprises an operator interface, also housed on the handle 13, which makes it possible, after the pointer 11 has been powered up, to activate the radiofrequency link such that the pointer 11 can exchange information with a remote equipment item comprising communication means compatible with those of the equipment item.

This interface consists for example of one or more control buttons 17, 18 that make it possible to access the various functionalities that can be implemented by the control and monitoring means, and a display 16 enabling the operator to be notified of the various information items delivered by the same control and monitoring means.

The control and monitoring means, as well as the communication means which are associated with them, can, according to the embodiment considered, be configured so as to perform more or less complex operations.

Thus, for example, in a simple embodiment of the device according to the invention, the control and monitoring means can be configured in such a way as to provide a standalone operation and use of the pointer 11 and to transmit only, via the radiofrequency link, a detection indication which can, for example, take the form of a beep of given duration or of an acoustic signal whose duration corresponds to that during which the detection of an object takes place.

Similarly, in another embodiment, the control and monitoring means can be configured in such a way as to ensure also the transmission of status information indicating, for example, the operating frequency of the pointer 11 or even the state of charge of the batteries which power it.

Similarly also, in another embodiment, the control and monitoring means can be configured in such a way as to ensure also the reception of control information from a remote equipment item, the commands to switch the emission of the pointer 11 on and off, or the control of its emission frequency for example.

Depending on the equipment with which the pointer 11 exchanges information, the radiofrequency link implemented is of variable nature. Preferentially, it is a link using a standard communication protocol, a Bluetooth™ link or a Wifi™ link for example. However, it can also be a link implementing a specific protocol, enabling the pointer 11 to communicate with the equipment item or the system considered, a system providing radio communication connections between different equipment within a private network for example.

Figure 2:
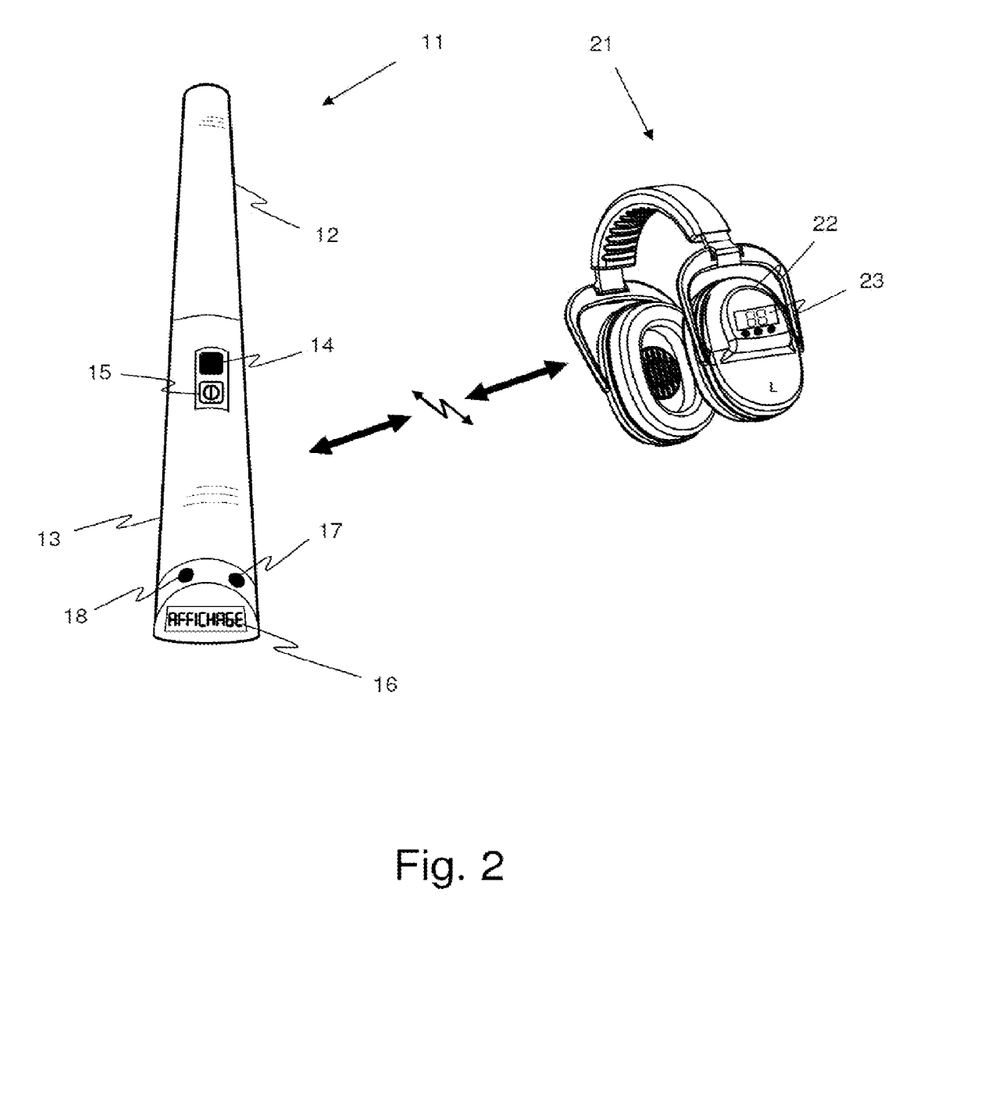
FIG. 2, a schematic representation of the equipment for locating metal objects according to the invention in the configuration comprising a pointer and an operator headset, the operator headset being represented with its left earphone in the foreground.

In addition to the pointer 11, as described in the preceding text, the device according to the invention can also comprise, according to a particular configuration, notably illustrated by FIG. 2, an operator headset 21 equipped with radiofrequency communication means configured to be compatible, in terms of waveform and of communication protocol, with the radiofrequency communication means with which the pointer 11 is equipped.

The operator headset 21 can, according to the case and according to the configuration of the pointer with which it is associated, also simply have communication means enabling it to receive, by radio, a detection beep emitted by the pointer, or else have more sophisticated communication means, associated with an appropriate user interface 22, enabling, for example, the operator to switch on or switch off the excitation of the coil of the pointer 11, to disable the buzzer mounted thereon or even to control the frequency of the excitation signal and to display, on a display 23, the operating configuration of the pointer 11.

In this configuration, the operator thus has a standalone pointer-headset assembly which enables him (or her) for example to disable the buzzer of the pointer 11 so as to operate discretely, while receiving, in the headset 21, in the form of a sound beep, of variable amplitude or repetition frequency for example, the warning signal generated thereby when a metal object is detected.

Figure 3:
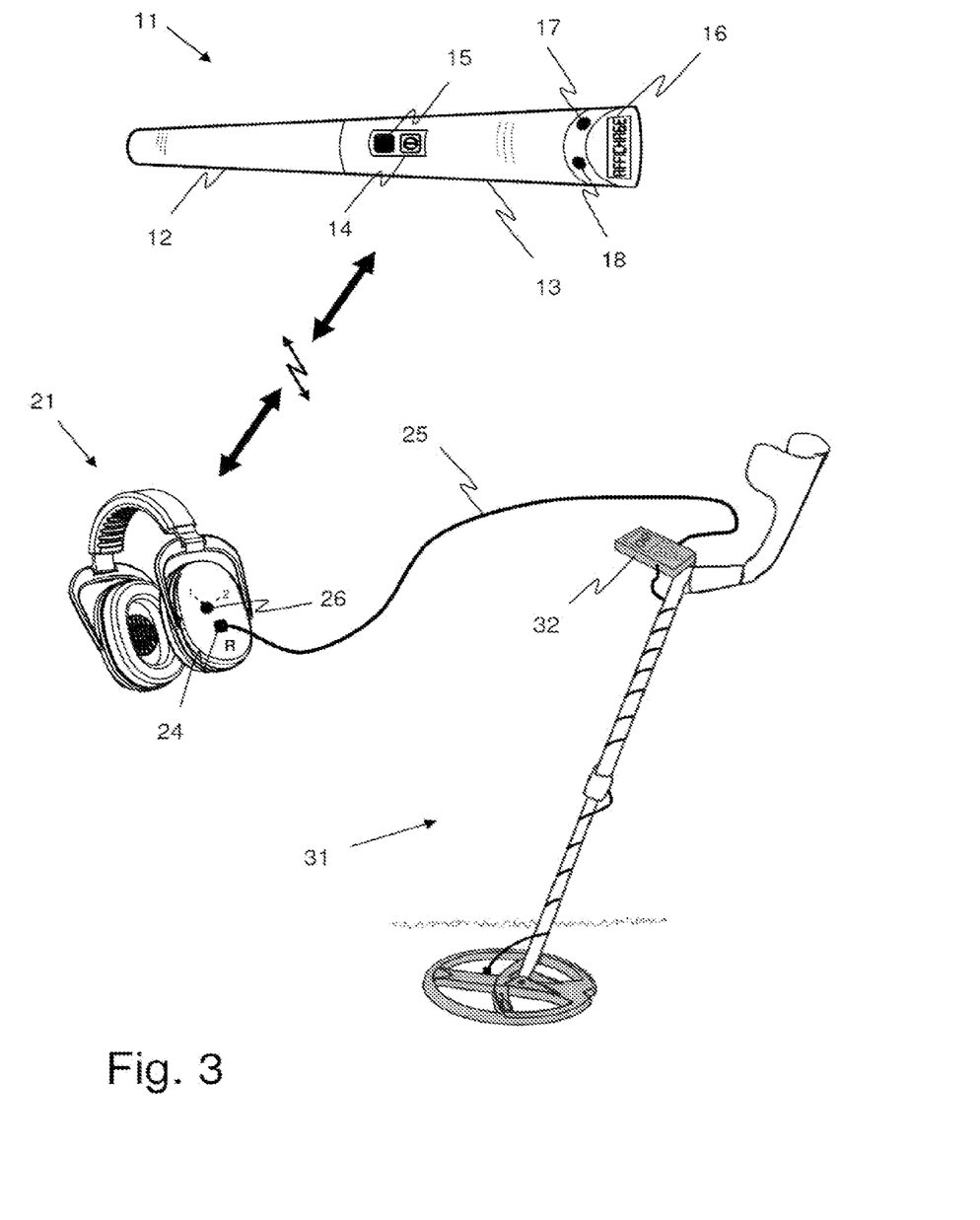
FIG. 3, a schematic representation of the equipment for locating metal objects according to the invention in the configuration of FIG. 2, the operator headset being represented with its right earphone in the foreground.

In a particular embodiment, illustrated by FIG. 3, the operator headset 21 can, moreover, comprise an audio input 24 enabling the operator to link his or her headset, by means of a cable 25, to the audio output of a given equipment item, the control unit 32 of a conventional metal detector 31 for example. It is then preferentially provided with a switching control, a touch control or even a switch-operated control 26 as illustrated by FIG. 3, enabling the operator to select the sound source connected to the earphones of the headset: the audio channel transmitted by the cable 25 or the radiofrequency link with the pointer 11.

In such an embodiment, the operator headset can also be configured to automatically disable the audio input from the moment when it is connected by radio link with the pointer 11. In this case, the reception of the detection signals that can originate from the pointer 11 by default takes priority if the latter is switched on, except if the operator decides otherwise.

In its configuration in which it comprises both a pointer 11 and an operator headset 21, the device according to the invention can be used alone, independently of any other equipment item, the sound beep characterizing the detection of an object being then transmitted to the operator headset by the radio link rather than being emitted by the buzzer with which the pointer 11 is equipped, such that the operator can proceed with his or her searches in total secrecy, without disturbing other people in the vicinity.

Figure 4:
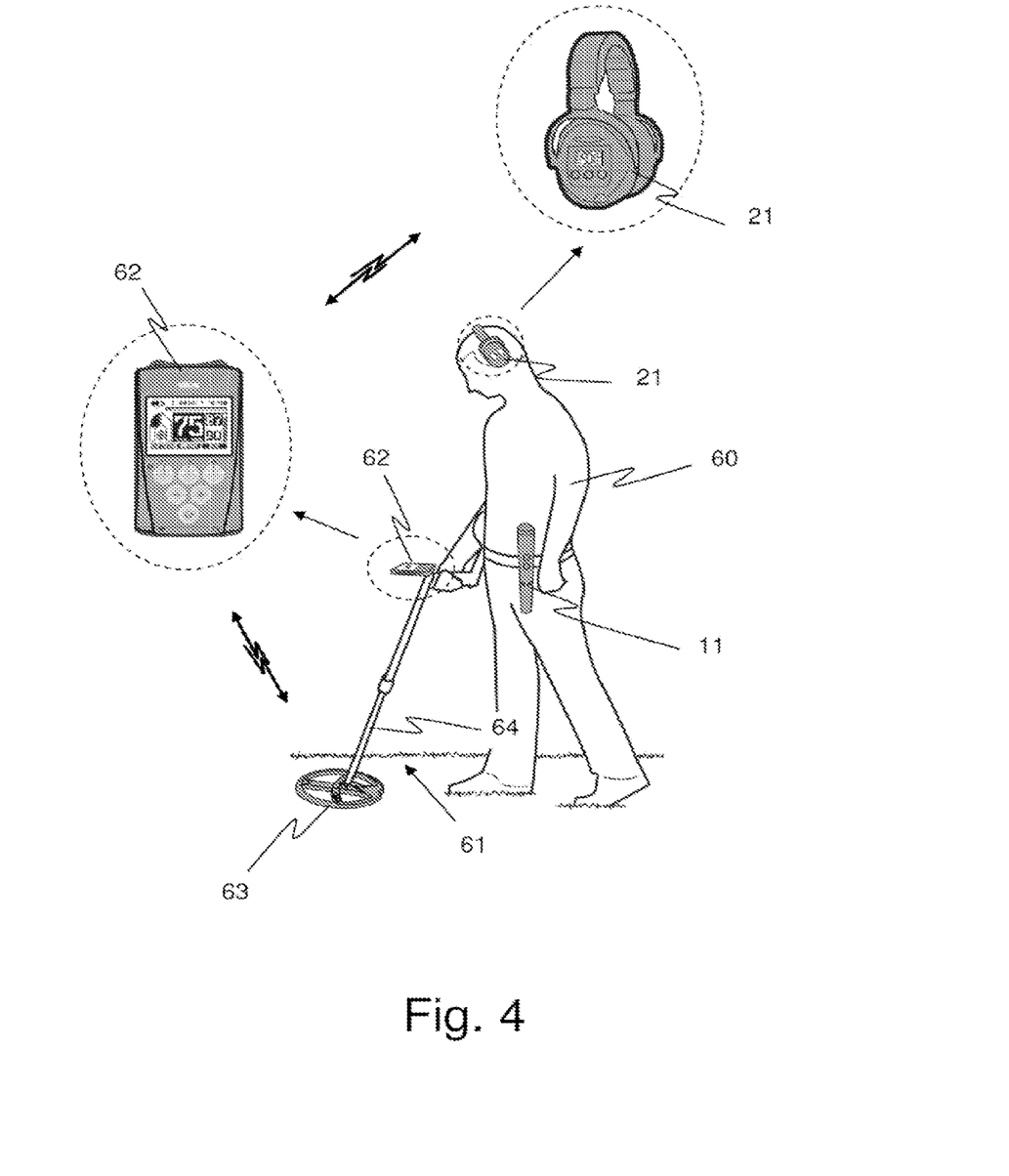
FIG. 4, an illustration representing the equipment for locating metal objects according to the invention incorporated in a usual metal detector qualified as main detector.

However, as illustrated by FIG. 4, the equipment item according to the invention can advantageously be incorporated in the operation of a bigger system, such as a wireless metal detector 61 equipped with a multipoint radio link linking the various elements that make up the detector, in as much as this link is compatible with the radiofrequency link linking the operator headset 21 to the pointer 11 of the location equipment according to the invention.

In such a mode of operation, the operator headset 21 can be configured, as illustrated by FIG. 4, to replace the headset normally used by the operator in the context of the use of the wireless metal detector 61.

Figure 5:
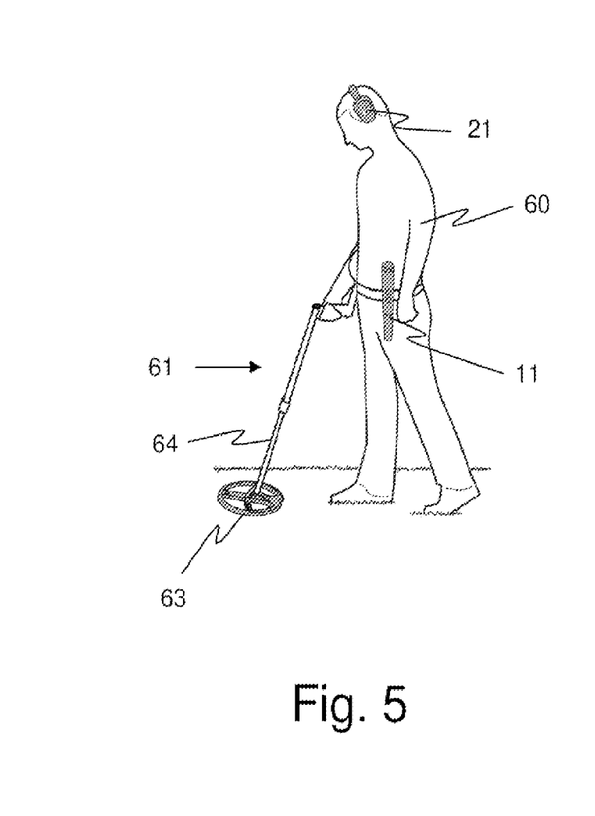
FIGS. 5 and 6, an illustration representing a first exemplary implementation of the equipment for locating metal objects according to the invention with a main metal detector.
Figure 6:
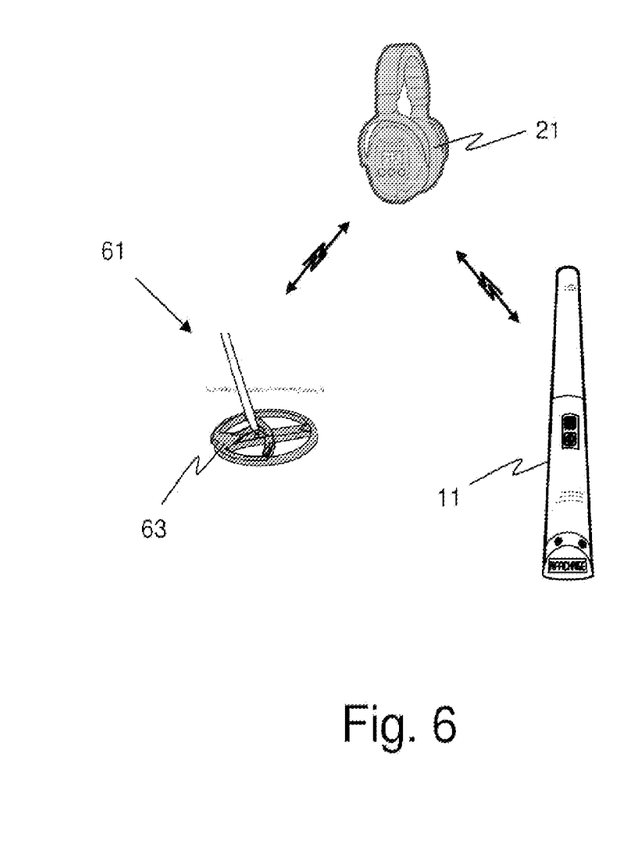

It can also be configured to replace, in the context of a simplified mode of operation of the main metal detector 61, the control unit 62 and directly drive the detection disk 63 and the pointer 11, as illustrated in FIGS. 5 and 6.

Figure 7:
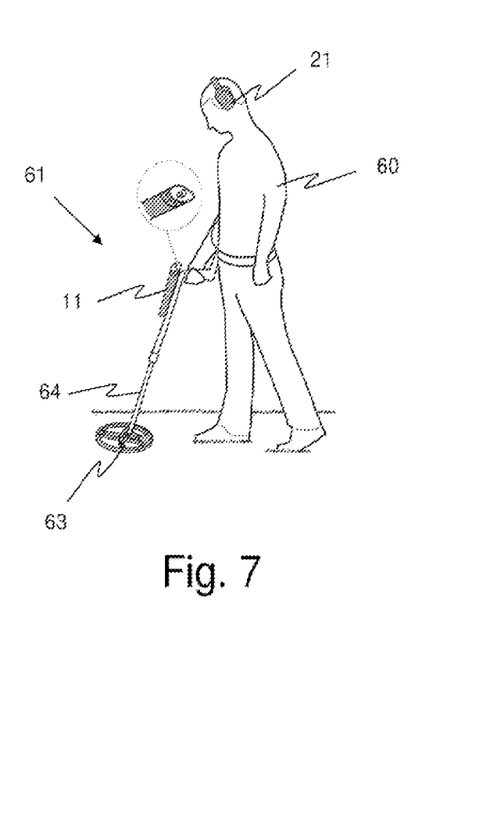
FIGS. 7 and 8, an illustration representing a second exemplary implementation of the equipment for locating metal objects according to the invention with a main metal detector.
Figure 8:
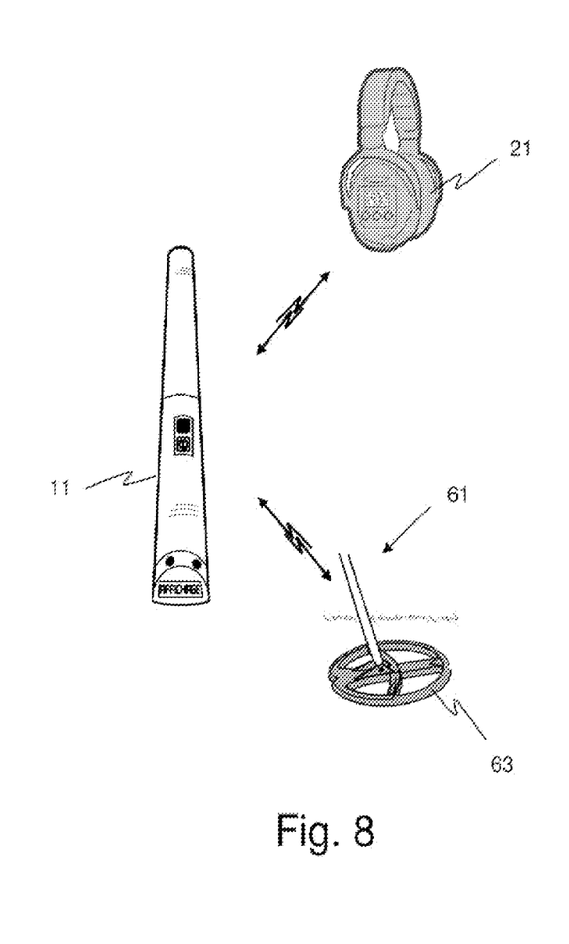

Similarly, in such a mode of operation, the pointer 11 can be configured, as illustrated by FIGS. 7 and 8, to replace the control unit 62 and manage both the operation of the detection disk 63 and that of its own detection coil, by having, for example, either the detection disk 63 or its detection coil operate alternately, or by processing only the detection signals emitted by one or other of the detection heads depending on the choice of the operator 60. The detection information originating from the detection coil of the pointer 11 or of the detection disk 63 of the metal detector 61 is then, for example, managed by the control and monitoring means of the pointer 11 and transmitted to the operator headset 21 in the form of a sound beep. Similarly, the configuration information of all the equipment is then managed by the control and monitoring means of the pointer 11 and displayed on the display 16 with which the latter is equipped.

The invention claimed is:

1. A metal detector set comprising:
   a metal detector having:
      a support rod;
      a detection head placed at an end of the support rod; and
      an electronic control and monitoring unit configured to manage the detection head, with said detection head and said electronic control and monitoring unit being linked to each other by a multipoint wireless link,
   said metal detector set further comprising;
   a proximity locator having;
      a handle;
      a housing;
      a detection coil; and
      a control and monitoring means with a radiofrequency link;
      wherein said control and monitoring means as well as said radiofrequency link of said proximity locator being housed in the handle of said proximity locator,
      wherein said metal detector set further comprising an operator headset also equipped with radiofrequency communication means, configured to be in radio communication with said radiofrequency link of said control and monitoring means, wherein the radiofrequency link of said control and monitoring means of said proximity locator is configured to wirelessly exchange information with the metal detector of the metal detector set, via the multipoint wireless link of the metal detector, wherein the information transmitted by the proximity locator via the radiofrequency link is configured to include information requesting that a detection signal provided by the detection head of the metal detector not be taken into account.

2. The metal detector set according to claim 1, wherein the control and monitoring means of the proximity locator may also perform at least one of the functions of the electronic control and monitoring unit of the metal detector.

3. The metal detector set according to claim 1, wherein the control and monitoring means of the proximity locator is configured to transmit to the operator headset information including a signal indicating detection of an object in a direction pointed to by the proximity locator.

4. The metal detector set according to claim 1, wherein the control and monitoring means of the proximity locator is configured to transmit to the operator headset information relating to an operating status and a functional configuration of the proximity locator.

5. The metal detector set according to claim 1, wherein the operator headset further comprises a selector to select either one of a detection signal transmitted by the control and monitoring means of the proximity locator or a detection signal transmitted by the electronic control and monitoring unit of the metal detector.

6. The metal detector set according to claim 1, wherein the multipoint wireless link of the metal detector is a link is a short-wavelength short distance wireless link.

7. A metal detector set comprising:
a metal detector having:
   a support rod;
   a detection head placed at an end of the support rod; and
   an electronic control and monitoring unit configured to manage the detection head, with said detection head and said electronic control and monitoring unit being linked to each other by a multipoint wireless link,
said metal detector set further comprising;
a proximity locator having;
   a handle;
   a housing;
   a detection coil; and
   a control and monitoring means with a radiofrequency link;
   wherein said control and monitoring means as well as said radiofrequency link of said proximity locator being housed in the handle of said proximity locator,
   wherein said metal detector set further comprising an operator headset also equipped with radiofrequency communication means, configured to be in radio communication with said radiofrequency link of said control and monitoring means,
   wherein the radiofrequency link of said control and monitoring means of said proximity locator is configured to wirelessly exchange information with the metal detector of the metal detector set, via the multipoint wireless link of the metal detector,
   wherein the information transmitted by the proximity locator via the radiofrequency link is configured to include information requesting the detection head of the metal detector to stop emission.

* * * * *